UNITED STATES PATENT OFFICE 2,386,446

COMPOSITION OF MATTER

Melvin De Groote, University City, and Bernhard Keiser, Webster Groves, Mo., assignors to Petrolite Corporation, Ltd., Wilmington, Del., a corporation of Delaware No Drawing. Application January 26, 1942, Serial No. 428,227

3 Claims. (Cl. 260—485)

This invention relates to new compositions useful for a variety of purposes including use as wetting agents, emulsifying agents, demulsifying agents, surface active agents, peptizing agents, textile assistants, and for other purposes.

The new compositions of the invention are esters of a polybasic carboxy acid with (1) a compound having a hydroxyl group, usually an alcoholiform hydroxyl group, and (2) a polyoxyalkylene glycol, usually one having 7 to 17 alkylene groups. In these compounds, if the acid is a dibasic acid, one carboxyl group is esterified by the glycol and the other by the hydroxylated body. If the acid has more than two carboxyl groups, one may remain free, or be neutralized with a base, or be esterified with a hydroxylated body which may be the same as or different from the glycol or the hydroxylated body with which at least one of the carboxy groups is esterified.

The new compounds of the invention may be represented by the formula:

XOOCDCOOY in which D represents the residue of a polybasic carboxy acid which may contain hydroxy groups, carboxy or esterified carboxy groups or other substituents, Y represents a polyoxyalkylene glycol residue usually having 7 to 17 alkylene groups, and X represents the residue of a hydroxylated body.

These new compounds may be prepared in various ways. Perhaps the simplest way is to prepare a fractional ester from a hydroxylated body and the polybasic acid, for example, by reaction of one mole of a dibasic acid with one mole of an alcohol, and then to react one mole of this ester with one mole of the polyoxyalkylene glycol. An alternative procedure is to prepare a fractional ester from the acid and the glycol and then react one mole of this with one mole of a hydroxylated body such as an alcohol. The latter procedure is, however, subject to what may, in some cases, be the disadvantage that the reaction of the acid and the glycol is apt to result in the production of a considerable proportion of polymerized product, by reaction of the free hydroxyl group and the free carboxyl group, with the production of long chain compounds, instead of the monomeric fractional esters. The new compositions are also readily prepared by treating a mono ester of a polybasic, usually a dibasic acid, with an alkylene oxide, advantageously ethylene oxide. The mono ester of the hydroxylated compound and the acid are readily produced by known esterification reactions. Treatment of the resulting material, having one or more free carboxy groups with ethylene oxide results in the esterification of the free carboxy group or groups with a polyethylene glycol radical which will consist of a number of ethylene groups linked together by ether oxygen atoms, and with a terminal hydroxyl group. The length of this chain will depend upon the molar proportions of the fractional ester and ethylene oxide used. Usually 7 to 17 moles of ethylene oxide for each mole of the fractional ester will be used, so that the product will be in substance the same as one produced from a polyethylene glycol having 7 to 17 ethylene groups and the fractional ester by the procedures referred to above. Naturally in all of the reactions which may be used, mixed products are usually produced, as side reactions, or polymerization, cannot be completely suppressed.

The first procedure for the production of the new compositions described above may be represented by the type equation:

YOH+HOOCDCOOH→YOOCDCOOH+
HOXOH→YOOCDCOOXOH in which D represents the residue of a polybasic carboxy acid, Y the residue of a hydroxylated body, and X a polyoxyalkylene chain.

As pointed out, the compositions produced are ordinarily mixed, and isolation of any particular compound from them is ordinarily impractical. The new compositions will therefore be usually used in the form of rather complex mixtures.

The reactions by which the new compositions are produced involve esterification, and are readily carried out in the known way. Thus the carboxylic acid body may be heated with the hydroxylated body or bodies to a temperature sufficiently high for the reaction to proceed with measurable speed, usually in the range of 100 to 200° C., but below the temperature of pyrolytic decomposition. The reaction may be hastened by the addition of small quantities of a suitable catalyst such as benzene sulfonic acid, or the like, by bubbling a dry, inert gas through the reaction mixture or in other ways. Perhaps the best way to speed up the reaction is by carrying it out in boiling xylene or other water-immiscible solvent, condensing the xylene vapors and water vapor, removing the water and returning the xylene to the reaction zone in accordance with known practice. This procedure hastens the reaction by providing effective removal of the water which is formed. This technique cannot be used with low boiling materials, such as ethanol, of course. Absorption of the water as it is formed, for example, through the use of a desiccant such as Drierite will also speed up the reaction, but this is usually more expensive than other available procedures.

The method of preparation in which a mono ester of a polybasic carboxy acid is treated with an alkylene oxide may be represented by the following equation:

in which Y represents the residue of the hydroxylated body, D the residue of a polybasic carboxy acid, and R an alkylene, usually ethylene, group. This reaction is readily carried out by treating the mono ester with the alkylene oxide in an autoclave, at temperatures around 100–150° C., the alkylene oxide being added in small portions as it is reacted until the total quantity desired has been added. Of course, if there are other groups in the mono ester which will react with an alkylene oxide, these may be blocked before treatment with the alkylene oxide or may be reacted with the alkylene oxide, in which case sufficient alkylene oxide will have to be used to permit both the esterification at the carboxyl group illustrated above and the other reaction.

For simplicity, the three essential types of radicals which enter into the formation of these new compositions, that is, the polyoxyalkylene glycol radical, the polybasic carboxylic acid radical and the hydroxylated body radical will be separately described in terms of compounds from which they may be readily derived, that is, in terms of the polyoxyalkylene glycols, the polybasic carboxy acids and the hydroxylated bodies to which they correspond; but it must be recognized that in producing the compositions it is not always necessary to use these compounds for their production. For example, the fractional diesters, if they are used, may be more readily prepared through the use of a dibasic acid anhydride such as maleic anhydride, than the acid itself.

The polyoxyalkylene glycols

The polyoxyalkylene glycol radicals in the new compositions may correspond to quite a wide range of glycols. Those glycols which contain a total of from 7 to 17 alkylene groups linked together through ether oxygen atoms give products which have important advantages. The oxyalkylene chain may be interrupted by a radical other than an oxyalkylene radical, which may introduce into the chain a functional group such as an amino group or a hydrophobe group or other group. The alkylene radicals will usually be ethylene radicals, for the obvious reason that the corresponding alkylene oxide, ethylene oxide, is commercially available at lower cost than other alkylene oxides. However, the alkylene group may contain from 2 to 4 carbon atoms, corresponding to propylene oxide or one of the butylene oxides, even though these compounds are not so readily available, particularly where high water-solubility is not desired.

The polyoxyalkylene glycols are readily prepared by the treatment of a glycol with an alkylene oxide, for example, by the treatment of ethylene or diethylene glycol with ethylene oxide. Such reactions are well known and proceed readily, and result in polyoxyalkylene glycol which may range from compounds having but 2 or 3 alkylene groups to compounds having a very large number of such groups.

For producing the compositions of this invention the polyoxyethylene glycols, commonly called polyethylene glycols, having from 7 to 17 ethylene groups, that is, the range from heptaethylene glycol through heptadecylethylene glycol, are advantageously used. Outstanding are those which have from 9 to 11 ethylene groups, representing the upper range of the distillable products and the lower range of the non-distillable products. These compositions are readily soluble in water and range from liquids to waxy solids.

If, instead of treating ethylene glycol with ethylene oxide, propylene or butylene glycol be so treated, very similar products are produced, as the slightly larger hydrocarbon radical in the central portion does not materially affect the properties of the glycol. However, if other types of bodies, having two groups or radicals reactive with ethylene oxide are so treated, compounds are formed which, while still usable for producing compositions of the invention, may be quite different from the simple polyoxyalkylene glycols. Thus if a glycol with a relatively long hydrocarbon chain, for example, octyl glycol, be treated, the resulting compound has a central hydrophobe group which may markedly affect the polarity and solubility characteristics of the final compound. Hydrophobe groups may also be introduced into the central part of the molecule by using, instead of a high molal glycol as the starting material, a substance such as octadecyl amine or dihydroxy stearamide. Additionally, basic groups, hydrophile or hydrophobe in nature, may be included. For example, ethyldiethanolamine or monoethylamine, treated with ethylene oxide, form polyoxyalkylene glycols with a basic hydrophile group in the central portion of the molecule while an amine such as octadecylamine forms polyoxyalkylene glycols with a basic hydrophile group and a hydrophobe group. Such dihydroxy bodies as oleyl monoglyceride may be treated with ethylene oxide to form suitable polyoxyalkylene glycols, as may such dihydroxy bodies as resorcinol or catechol. It will be understood that in this specification and claims, where reference is made to a polyoxyalkylene radical, it is intended to include radicals of this type, derived by the treatment of a body having two groups reactive with ethylene oxide or other alkylene oxide to form a compound having a polyoxyalkylene chain, even though it is interrupted by a different type of radical. Where the intention is to designate specifically a polyoxyalkylene radical uninterrupted by a different radical, it will be so stated.

As pointed out above, these polyoxyalkylene glycols are readily prepared by known procedures, involving the addition of ethylene oxide to a glycol, dihydroxy body, primary amine, dihydroxy secondary amine or the like by adding to the initial body the alkylene oxide, usually in small successive quantities in an autoclave under pressure and at temperatures which usually range from about 100 to about 200° C. The most useful compounds are the non-polar, water-soluble compounds containing only alkylene groups linked by ether linkages and with two terminal hydroxyl groups. The alkylene groups will usually have two carbon atoms although they may have three or four carbon atoms.

The polybasic carboxylic acids

Various polybasic carboxy acids may be used in producing the new products, the essential limitation being that the carbon-linked chain of the polybasic acid be non-aryl and contain not more than 6 carbon atoms. Included in the acids which may be used are the saturated dibasic acids such as oxalic, malonic, succinic, glutaric, adipic, pimelic and suberic acids; the unsaturated acids such as fumaric, maleic and glutaconic acids and the tribasic and hydroxy polybasic acids such as citric, malic and tartaric acid as well as other polybasic acids having the required small carbon nucleus. Selection of the acid to be used will usually depend upon price and convenience of manufacture, and, of course, the particular properties desired in the final product. For example, if a water-insoluble final product is desired, it may be advantageous to use an acid such as adipic or suberic acid, while if a quite soluble product is desired, it will be advantageous to use an acid such as oxalic acid, and particularly maleic acid.

As pointed out, convenience of manufacture will be one of the important considerations. Thus oxalic acid, though available and relatively inexpensive, is not usually as useful as some of the other acids because it tends to decompose readily at temperatures but slightly above the boiling point of water. The reactions involved in producing the new compositions are largely esterification reactions, and generally speaking, the yield obtained and the speed of the reaction will increase with increasing temperatures, within reasonable limits, say up to 150–200° C. It is usually better therefore to use an acid which is more resistant to pyrolytic decomposition than oxalic acid.

The polybasic carboxy acids may be substituted or unsubstituted. Thus such acids as sulfo succinic acid, sulfo adipic acid, and other sulfo di and other polybasic carboxy acids may be used.

Maleic anhydride is particularly useful. It reacts readily, its cost is relatively low on a molar basis. Succinic acid and adipic acid, or their anhydrides, are similarly attractive on the basis of cost and convenience of manufacture. Maleic anhydride, however, has the further advantage that, in the final composition, it is capable of reaction with a material such as sodium bisulfite to form the corresponding sulfo-succinic acid derivative, thus, except in certain instances hereafter described, greatly increasing water-solubility of the compounds and providing them with one or two strongly polar groups which, for certain purposes, is a marked advantage.

Hydroxylated bodies

The hydroxylated bodies which may be used in forming the new compositions, in the ways described above or in other ways, include a wide range of bodies having one or more alcoholic hydroxyl groups which can be esterified by carboxylic acids, including water-soluble compounds, water-insoluble compounds and water-dispersible compounds, i. e., self-emulsifiable compounds. Included are hydroxylated bodies ranging from the simple lower aliphatic alcohols, e. g. ethanol and the lower water-soluble amino alcohols, e. g., triethanolamine, through the water-insoluble higher aliphatic alcohols such as lauryl, cetyl and dodecyl alcohol, the more complex hydroxy esters or acids such as castor oil and dihydroxy stearic acid ethyl ester, through the highly complex hydroxylated amines and amides such as the hydroxylated polyalkylene polyamines, acylated hydroxylated polyamines, hydroxylated acylated amino ethers, partially esterified polyhydric alcohols and polyglycerols, etc. For convenience, those hydroxylated bodies will be classified to show by appropriate illustrations various types of hydroxylated bodies contemplated and subclassed to which they belong.

1. *Aliphatic alcohols.*—Any of the aliphatic alcohols, water-soluble or water-insoluble, saturated or unsaturated, substituted or unsubstituted, may be used. Included are ethyl alcohol, butyl alcohol, isopropyl alcohol, hexyl alcohol, oleyl alcohol, dodecanol, alcohols, derived by the hydrogenation of mixed higher fatty acids, particularly those naturally occurring in fats and oils, the alcohols derived by the saponification of naturally occurring waxes such as spermacetti, etc.

2. *Miscellaneous hydroxy hydrocarbon compounds.*—Included in this group of alcohols are the more or less complex mixtures of hydroxylated bodies resulting from the reduction of naphthenic acids, the "wax acids," that is, the acids resulting from the oxidation of petroleum, resinic acids, abietic acids, tall oil, and other products of this nature.

3. *Aromatic alcohols.*—The aromatic alcohols which may be used include the aralkyl alcohols such as benzyl and phenylethyl alcohol, as well as the alkyl, cycloalkyl, aralkyl or aryl ethers of polyhydric alcohols such as the cresol, phenol, naphthol, cyclohexanol and benzylic ethers of a glycol or glycerin.

4. *Phenols.*—The phenols are hydroxylated bodies which may be used in producing the new esters. Included are the simple monohydroxy phenols such as phenol, naphthol, cresol and xylenol; the polyhydroxy phenols such as resorcinol, alkyl resorcinols, catechol, hydroquinone and other alkylated derivatives, as well as such phenolic bodies as guaiacol and the like.

5. *Hydroxylated esters.*—A wide range of hydroxylated esters may be used in producing the new compounds. Such hydroxylated esters may result from the esterification of a hydroxy acid with an alcohol or from esterification of a non-hydroxy acid with a polyhydric alcohol or phenol. They may have more than one hydroxy group, e. g., as in such hydroxylated bodies as result from the partial esterification of a polyhydric alcohol or a polyhydroxy phenol with a hydroxy fatty acid. Thus, included in this group of hydroxylated bodies are the ricinoleic acid esters of various alcohols, particularly the simple aliphatic alcohols or glycols or glycerin, such as castor oil, ethyl ricinoleate, the monoricinoleic acid ester of ethylene glycol, etc., and corresponding esters of dihydroxy stearic acid and the like. With a lower hydroxy acid, such as lactic acid, the alcohol used will advantageously be a higher, water-insoluble alcohol, such as octyl alcohol, dodecyl alcohol or the like, although the esters of lactic acid with lower alcohols such as ethyl alcohol or glycol may be used, particularly for the production of compositions which are highly water-soluble. In addition to these, the monoesters of such phenols as resorcinol and catechol are included, whether the acid be of low molecular weight such as acetic acid, or of higher molecular weight such as oleic acid. Of particular importance are the esters of the detergent forming acids, that is, those carboxylic acids having more than eight carbon atoms and usually not more than 32 carbon atoms, including the acids occurring naturally in oils and fats, particularly castor oil, the naphthenic acids, resin acids, tall oil and the like, with polyhydric alcohols, for example, the mono and diglycerides, the half esters with glycols, the partially esterified polyglycerols, partially esterified sugar alcohols, etc.

6. *Alicyclic alcohols.*—This group includes the simple alicyclic alcohols such as cyclopentanol, cyclohexanol, and their alkylated homologues such as methyl or ethyl cyclohexanol and, for convenience of classification, the wholly or partially hydrogenated phenols and alkylated phenols such as tetrahydrophenol, hexa-, octa- and deca-hydronaphthol, etc., as well as the alicyclic aliphatic alcohols, such as cyclohexylethanol, etc.

7. *Amides of hydroxy acids.*—This group includes the amides of the hydroxy acids generally, including the low molecular weight hydroxy acids and the high molecular weight hydroxy acids. The lower ones are usually water-soluble, while the amides of the higher acids are water-insoluble. The amides may be amides of such hydroxy fatty acids as lactic acid, glycolic acid, and hydroxy butyric acid, although they will usually be formed from the higher water-insoluble hydroxy acids, the commonest of which is ricinoleic acid, including such acids as hydroxy stearic acid, dihydroxy stearic acid, diricinoleic acid, aleuritic acid and the like. In the oxidation of petroleum hydrocarbons, hydroxylated wax acids are commonly produced as a by-product, and these may be used. Other hydroxylated acids are readily produced by known procedures, as in the conversion of undecylenic acid to hydroxy undecanoic acid. Similarly, the naphthenic acids and other acids can be converted into hydroxylated products which may be used. Unsaturated hydroxy acids such as ricinoleic acid can be converted into hydroxylated aryl stearic acid by reaction with benzene in the presence of aluminum chloride, or hydroxylated products may be produced by the desulfonation of a sulfoaromatic acid, and such bodies may be used. Another group of hydroxy acids which may be converted to amides for use are the alpha hydroxy acids derived by hydrolysis of the alpha halogen substituted acids such as alpha-bromcaproic acid, alpha-bromcaprylic acid, etc.

These amides are readily prepared in the known ways by treating the acid or a derivative thereof, such as the acyl halide or ester, with ammonia or a primary or secondary amine. The methods of producing amides in this way are well known. Usually, for reasons of cost and simplicity, and except in certain instances where it is desired to reduce water solubility, ammonia will be used. However, the primary amines, particularly the lower amines such as butyl amine, anilin and cyclohexylamine will also give highly satisfactory amides. The corresponding secondary amines can also be used.

8. *Hydroxylated amides.*—The amides described in paragraph 7 are the amides resulting from the treatment of a hydroxy acid, or suitable derivative thereof with ammonia or an amine. The hydroxylated amides of this group are those in which an acid amide is substituted by a hydroxy hydrocarbon radical containing at least one alcoholic hydroxyl group. Thus these compounds are of the type in which one hydrogen atom of ammonia is replaced by an acyl group, such as an acyl group corresponding to a detergent forming acid, or a lower fatty acid, such as acetic acid or butyric acid, or other carboxylic acid, and at least one of the other hydrogens of the ammonia is replaced by a hydroxy alkyl radical, such as the ethanol radical, the hydroxy propyl radical, etc., or even an oxyalkylene radical, such as results from the treatment of the acid amide with more than one mole of an alkylene oxide, such as ethylene or propylene oxide. The detergent-forming carboxy acids are those which have a sufficiently large carbon-linked chain or radical so that their salts have soap-like properties, the hydrocarbon radicals usually containing from 8 to 32 carbon atoms. Included are the fatty acids of the natural oils and fats such as cocoanut oil, tallow, and the like, oleic acid, ricinoleic acid, hydroxy stearic acid, naphthenic acids, talloil acids, resin and abietic acids, wax acids, fish oil acids, such derivatives of these acids as the halogenated derivatives, aromatic fatty acids such as phenyl stearic acid, and the like. This class of acids is well recognized. These hydroxylated amides may be prepared in various ways, such as by reaction between the carboxy acid and a monoalkylol amine, such as monoethanolamine, monopropanolamine, etc., or by reaction of the acyl chloride of a carboxy acid with a monoalkylol amine; or by the treatment of the primary amide of a suitable carboxy acid with an alkylene oxide, such as ethylene oxide, propylene oxide, butylene oxide, etc. In this latter method particularly, there is no limitation to the production of the secondary amine type of product, but tertiary compounds, having one hydrogen of ammonia replaced with an acyl group, and the other two with hydroxy alkyl groups or one with a hydroxy alkyl group and the other with a hydrocarbon group such as an alkyl, aryl, aralkyl or alicyclic group may be produced. Where the hydroxylated amides are produced by the treatment of an alkylol amine with a carboxy acid, or ester or acyl chloride, and particularly in the latter case, the secondary amines, including the dialkylolamines and the alkylalkylolamines may be so treated. The hydroxylated bodies so produced may have a number of hydroxy radicals in the group or groups substituted for the ammonia hydrogen atoms. For example, the amides produced from diglyceryl amine may have four hydroxy radicals.

9. *Hydroxylated amines.*—This group includes the hydroxylated amines of basic character, such as the alkylolamines, the alkylolalkylamines, etc. Of particular importance are the amines of this type which have at least one group having a hydrocarbon radical having at least eight carbon atoms and up to as many as 26 carbon atoms or even more. The hydroxyl groups of these compounds are those of a hydroxy hydrocarbon radical or radicals or similar radical or radicals, in which the carbon chain is interrupted at least once by an oxygen atom, such as a hydroxy oxyalkylene group. These hydroxylated amines may be prepared in various ways, for example, by the treatment of a primary or secondary alkyl amine with a hydroxy alkylating agent, such as ethylene, propylene or butylene oxide. Methods of producing amines of this type are well known and need not be described here. Among the hydroxylated amines which may be used are included the products resulting from the treatment with an alkylene oxide of primary amines, such as ethylenediamine, butylamine, octylamine, dodecylamine, laurylamine, cyclohexylamine, cetylamine, stearylamine, oleylamine, ricinoleylamine, amines derived from naphthenic acids, from ocetadecadiene acids, amines derived from mixed fatty acids corresponding to naturally occurring fats and oils, decylamine, amines corresponding to oxidized wax acids, etc.; as well as secondary amines, including those having two lower alkyl groups, such as diethylamine, dibutylamine, etc., and those having two different alkyl groups, for example, methyloctylamine, ethyldecylamine, propyldodecylamine, etc. Any of these primary or secondary amines, upon treatment with an alkylene oxide, particularly ethylene oxide, yields a hydroxy alkylamine. It is not necessary that the hydrocarbon group linked to the amino nitrogen atom be an aliphatic group, as it can be an aliphatic, alicyclic, aryl or aralkyl group, for example, naphthyl, cyclohexyl, benzyl, etc. Where there is no aryl group directly joined to the amino nitrogen atom, the compounds are relatively basic in nature; and in general, it is better to use the basic type of compound.

However, for some purposes, the less basic compounds which are produced when there is an aryl group directly joined to the amino nitrogen, as when anilin or naphthylamine is treated with an oxyalkylene agent, may have advantages.

10. *Hydroxylated polyacylated polyaminoamides.*—These compounds are those resulting from the treatment of a polyalkyleneamine, such as diethylenetriamine, triethylenetetramine, tetraethylene pentamne, and homologues thereof derived from propylene dichloride, butylenedichloride, amylenedichloride, betahydroxypropylenedichloride (glycerin dichlorhydrin), etc., with acylating agents and, if introduction of the acyl group or groups does not introduce an alcoholiform hydroxyl group, with an oxyalkylating agent, such as ethylene, propylene or butylene oxide. One or more acyl groups may be introduced, and one or more hydroxy radicals, such as hydroxy alkyl radicals or hydroxy alkylene radicals may be introduced. The most useful are those compounds in which there are (1) two acyl radicals derived from lower carboxy acids, that is, those having five or less carbon atoms linked to the terminal nitrogen atoms, (2) an acyl radical derived from a detergent- forming monocarboxy acid, that is, a carboxy acid having from 8 to 32 carbon atoms, (3) an alcoholiform hydroxyl radical, and (4) at least one basic amino nitrogen group, that is, an amino nitrogen radical free from directly linked acyl or aryl radicals.

These compounds are readily produced by treating the polyalkyleneamine with the carboxy acid (or amide, ester, anhydride, acyl chloride or other suitable derivative thereof) to introduce the acyl group or groups. Usually, if the terminal nitrogen atoms are to be acylated with a lower acid, such as acetic acid, formic acid, propionic acid, butyric acid, furoic acid, lactic acid, hydroxy butyric acid, or the like, it is advantageous to treat the polyalkyleneamine with whatever agent is used to introduce such acyl groups, and subsequently, to introduce the acyl group of the detergent-forming carboxy acid, before or after the introduction of the group having the alcoholiform hydroxy radical. Thus, after the introduction of the one or two or more acyl groups of a lower carboxy acid, the polyalkyleneamine may be treated to introduce the higher acyl group or it may first be treated with an alkylene oxide to introduce a hydroxylated group and then treated to introduce the higher acyl group. Thus the higher acyl group may be introduced in the acyl form linked to the amino nitrogen, or may be introduced in the ester form, linked to a hydroxy alkyl or hydroxy oxyalkyl group, as long as there remains in the compound at least one free alcoholiform hydroxyl group.

11. *Acylated amino-ethers.*—This group of compounds includes those in which an etherified amine is acylated, usually by a detergent-forming monocarboxy acid, although it may be by other types of acids, such as the lower fatty acids or other acids, the acylated product having at least one alcoholic hydroxyl radical, which may be attached to the acyl group or groups, or may be linked to an amino nitrogen through an alkyl group, or may be a portion of the etherifying radical, as in the case of an ether of an alkylolamine with a polyhydric alcohol, in which one of the hydroxyl groups is acylated with a detergent-forming acid and another is free. Thus the group includes such compounds as the acyl derivatives of the ethers of triethanolamine with polyhydric alcohols such as glycerin, polyglycerol, glycol, alkylolamines, hydroxylated amidoamines, aryl alkanolamines, etc. The acyl group is usually linked to the ether by an ester linkage, although it may be so linked by an amide linkage. Typical compounds are those resulting from the acylation of the ether of monoethanolamine with glycerin; or the etherification of diethanolamine with a monoglyceride of a higher fatty acid; the simple ether of triethanolamine with a mono or diglyceride of a higher fatty acid, at least one of the hydroxyl groups of the triethanolamine being free, etc. In the following table giving typical formulae of amino ethers which may be acylated to produce compounds included within the present group, the letter T indicates an amino hydrogen, or a substituent therefor, such as an alkyl group, an alkylol group, an aryl group, an aralkyl group, or other group which may be used to replace an amino hydrogen atom in the production of suitable compounds. The compounds illustrated may be acylated with a detergent-forming monocarboxy acid, or other carboxylic acid, (or, of course, by the corresponding acid halide, amide, ester, etc.) to provide a compound of the present group.

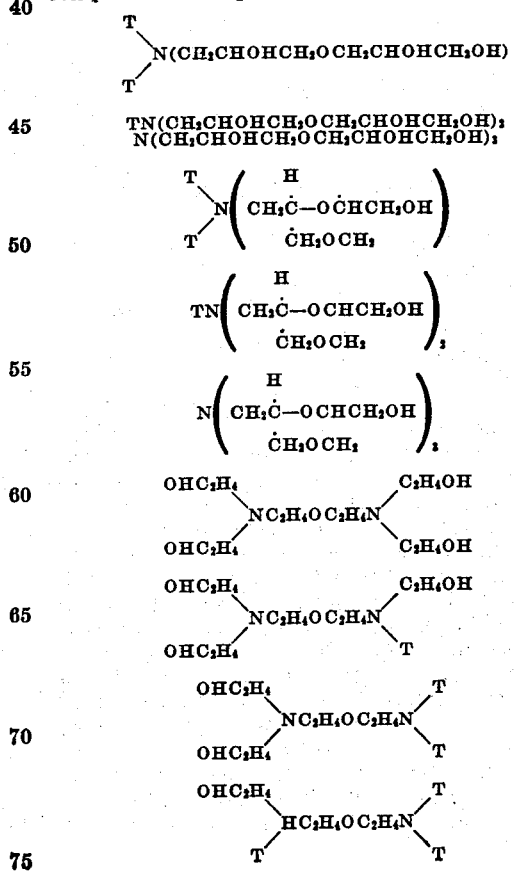

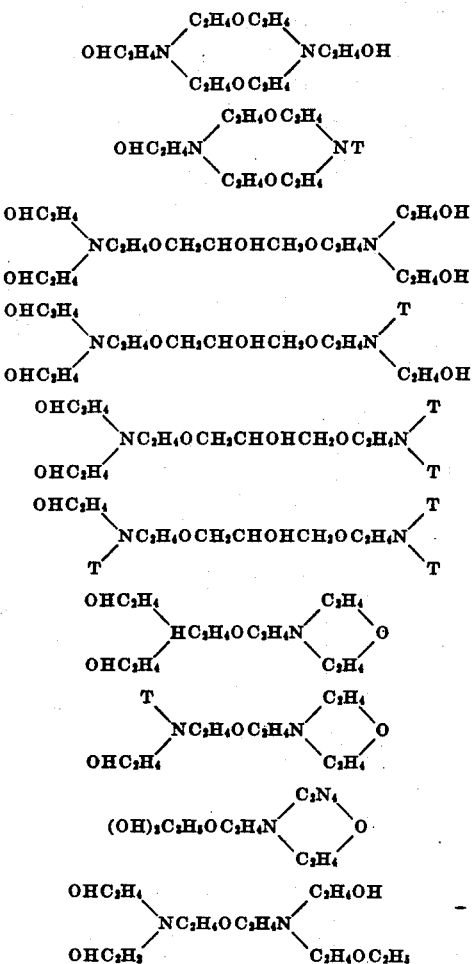

The foregoing compounds are, of course, illustrative of the type of compound contemplated in the present group. Where the radical $C_2H_4$ occurs, it may be replaced by other suitable radicals such as $C_3H_6$, $C_4H_8$, etc., or by a residue from an alicyclic radical, such as the cyclohexyl radical, or a residue of a benzyl radical, etc. The glyceryl radical may be replaced by homologues, such as methyl glycerol, etc. Instead of the monomeric formula illustrated, the compounds may in fact be in the polymeric form, containing a large number of residues derived, for example, from polyhydric alcohols or hydroxy alkylamines, continuous etherization in effect being the same as polymerization. The manufacture of ethers of this type is known, and need not be here further illustrated.

Acylation of the hydroxy amino ethers of the type just described results in acylated compounds of the kind included in this group. As pointed out above, the acylation may be with a detergent-forming acid acyl group, such as the higher fatty acids, naphthenic acids, wax acids, talloil, etc., or with other types of acids, such as the lower fatty acids, e. g., acetic and butyric acids, maleic acid, etc. The acyl radical may be introduced through an ester linkage, by reaction at a hydroxyl group, or may be linked directly to a nitrogen atom to form an amide. Where the amino ether has a free hydroxyl group, for example, as a portion of a polyhydric alcohol residue, the acyl group may be linked to the polyhydric alcohol residue through an ester linkage. On the other hand, where an amino ether has more than two hydroxyl groups, all or any part of these hydroxyl groups, except one, of course, may be so acylated. On the other hand, a material such as a glycerol ether of monoethanolamine may be converted into the amide by introduction of an acyl group linked directly through the amino nitrogen atom; but in such case it is usually more convenient to form the amide first and then carry out the etherification.

Suitable products may be prepared, for example, as described in Patent 2,228,989 by the heating of a partially esterified tertiary amine with a polyhydric alcohol for a sufficient period of time to cause condensation with elimination of water and the production of an ethereal reaction product. Indeed, as described in that patent, such products may be prepared, for example, by heating a fat, for example, cocoanut oil, with triethanolamine or the like for a prolonged period at temperatures ranging up to 160 to 180° C. for a considerable period of time, e. g., two days. The course of the reaction in such case seems to be that alcoholysis or re-esterification at first takes place, with formation of a mixture of the ester of triethanolamine with glycerin, etc. If, after the alcoholysis or re-esterification has taken place, more glycerin is added and the heating is continued, etherification takes place, with the production of ethereal reaction products, such as the dihydroxypropyl ether of the monofatty acid ester of triethanolamine, along with, of course, other products, including more complex ethers. These materials are suitable for preparing the acylated derivatives of this group.

12. *Amino ethers.*—The compounds included within this group are the simple amino ethers corresponding to the unacylated compounds of the preceding group, that is, the amino ethers of the preceding group without the acyl group or groups attached thereto, although this group includes a number of materials—amino ethers—incapable of acylation to produce compounds useful in the preceding group. For example, included in this group are the ethylene glycol ether of diethylethanolamine. This compound has only one hydroxyl group, and the only amino group is a tertiary group, so that the compound cannot be acylated to produce an acylated amino ether having an alcoholic hydroxyl group; except of course if the acylation is with a hydroxy acid, such as ricinoleic acid or hydroxy stearic acid. If a hydroxy acid is used, the resulting compound belongs in the preceding group.

13. *Partial esters of alkylolamines.*—Included in this group are the partial esters of alkylolamines with carboxylic acids, particularly the higher fatty acids and other detergent-forming fatty acids. Included are the esters of such amines as triethanolamine, diethanolamine, glyceryl amine, diglycerylamine, ethyldipropanolamine, etc., and in general, the esters of the various alkylolamines having more than one hydroxyl group as long as the esterification is but a partial esterification, leaving at least one hydroxyl group linked by a suitable radical, such as an alkyl or oxyalkyl radical to the amino nitrogen. Methods of producing these partial esters are known. They are readily produced by the reaction of a triglyceride, for example, with an alkylolamine in proportions such that there is present insufficient fatty acid to esterify all of the hydroxyl groups of the alkylolamine. Suitable partially esterified alkylolamines may also be prepared, for example, by completely esterifying a primary or secondary alkylolamine, such as mono or diethanolamine, with a suitable carboxylic acid, and then reacting the resulting ester with an alkylene oxide, such as ethylene oxide, to introduce an oxyalkyl or hydroxyoxyalkylene group which may have a number of ether linkages, for example, five or more.

14. *Hydroxylated esters of sulfonic acids.*—This group includes esters of sulfonic acids which may be represented by the formula:

$$RSO_3TOH$$

in which R represents the residue of a sulfonic acid and T represents the residue of a polyhydric alcohol. T may represent a hydrocarbon radical, if the polyhydric alcohol, for example, is ethylene glycol, or may represent an oxyalkylene radical, if the polyhydric alcohol is, for example, a polyoxyalkylene glycol, or it may represent the residue of a glyceryl radical, the residue of a monoglyceride, etc. Suitable sulfonic acids include both the oil and water-soluble petroleum sulfonic acids, i. e., the green and mahogany acids, aryl sulfonic acids, including benzene sulfonic acids, cymene sulfonic acid, naphthylene sulfonic acid, alkylated naphthylene sulfonic acid, fatty sulfonic and fatty aromatic sulfonic acids, partially or completely hydrogenated or alkylated dicarbocyclic sulfonic acids, etc., all of which are available or may be readily prepared by known methods. The hydroxylated esters of the sulfonic acids are known. Direct reaction between a sulfonic acid and a polyhydric alcohol, such as ethylene glycol, to produce them, is impractical, because the yield is very small, if any yield is obtained. The esters may, however, be prepared by converting the sulfonic acid into the sulfon chloride, and reacting the sulfon chloride with a polyhydric alcohol, with liberation of hydrochloric acid and formation of the hydroxylated ester. Usually, however, a salt of the sulfonic acid, for example, the sodium salt, will be reacted with a chlorhydrin, such as ethylene glycol chlorhydrin or the like. Another method of preparing suitable hydroxylated esters of sulfonic acids is to treat the free sulfonic acid, in an anhydrous state, with an alkylene oxide, or a compound containing an olefin oxide radical, such as glycerin epichlorhydrin, glycide alcohol, ethylene oxide, propylene oxide, one of the butylene oxides, cyclopentane oxide, styrene oxide, etc., with introduction of a hydroxy alkyl or hydroxyoxyalkylene group. If, for example, an anhydrous sulfonic acid be treated with one mole of ethylene oxide, the sulfonic acid ester of ethylene glycol is produced. If two moles of ethylene oxide are used, the ester of the type:

$$RSO_3C_2H_4OC_2H_4OH$$

is produced; and if more ethylene oxide is used, esters with recurring ether linkages are produced.

15. *Hydroxylated pyridinium derivatives.*—Pyridine hydrochloride will react with certain hydroxy amines and amides as illustrated by the equation:

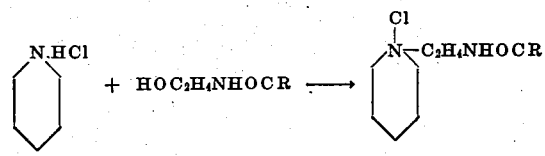

If the hydroxylated amide or esteramide has more than one hydroxyl group, as in the ricinoleic acid amide derived from diethanolamine, the resulting pyridinium derivative will have at least one hydroxyl group which may be esterified. Such derivatives of pyridine, and other hydroxylated derivatives of pyridine, of which there are a large number available, may be used in producing the new compositions of the invention, including such products as are derived by reacting pyridine hydrochloride with hydroxyethyl ricinoleyl amide, the corresponding hydroxyethyl amide derived from oxidized castor oil, phenylstearic hydroxyethyl amide, the product derived by treating castor oil with chloracetyl chloride, bis (hydroxyethyl) ricinoleyl amide, etc.

Of particular importance in this group are pyridinium derivatives derived by reacting glycerides, such as triricinolein, with chloracetic acid, to give an ester of chloracetic acid, and then reacting with pyridine to give a pyridinium compound. Such ester need only contain one ricinoleic acid group, and one may employ a mixed ester, for example, a glyceride containing two oleic acid groups and one ricinoleic acid group.

16. *Oxyalkylated imidazolines.*—This group includes the oxyalkylated imidazolines substituted in the 2-position by a radical such as an alicyclic hydrocarbon radical, an alkyl radical, hydroxylated alkyl or alicyclic radical, or the like. The compounds included in this group may be regarded as derivatives of imidazole, or glyoxaline, represented by the formula:

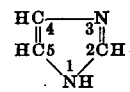

The imidazolines may be regarded as the dihydroderivative of imidazoles, and may be indicated by the formula:

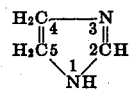

The production of 2-substituted derivatives of compounds of this type are well known. They may be produced by reacting polyamines and higher carboxylic acids under appropriate conditions, with formation of derivatives which may be represented by the formula:

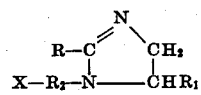

in which R represents the residue of the carboxy acid, and may be an alkyl or alkenyl or other group, $R_1$ represents hydrogen or an alkyl group, $R_2$ represents an alkylene group, or a lower alkyl substituted alkylene group and X represents a hydroxyl group, an amino group, or an aminoalkylene substituted amino group. The preparation of such compounds is well known. If such compounds are treated with an alkylene oxide, such as ethylene oxide, the oxyalkylene radical is readily introduced, and it is such oxyalkylated compounds which are included within this class.

17. *Hydroxy acids.*—There are a number of hydroxy carboxylic acids which are capable of reacting with carboxy acids by a reaction involving esterification of the hydroxyl group, and it is these acids which constitute this sub-class. Included are the hydroxy acids of the detergent class, such as ricinoleic acid, hydroxy and dihydroxy stearic acid, diricinoleic acid, aleuritic acid, alpha-hydroxy lauric acid, hydroxylated acids derived from such materials as naphthenic acids, hydroxy acids produced in the oxidation of petroleum hydrocarbons and the like. Also included are the lower hydroxy acids such as lactic acid, hydroxy butyric acid, alpha-hydroxy capric caprylic and caproic acids.

18. *Miscellaneous alcohols.*—Heterocyclic alcohols such as furfuryl and tetrahydrofurfuryl alcohols and the terpene alcohols such as borneol, fenchyl alcohols, menthyl alcohols and the like, are included in this sub-class.

The foregoing classification of hydroxy compounds, and particularly compounds having alcoholiform hydroxyl groups is not intended to be exhaustive. Obviously, there are other types of hydroxy compounds which might be used, and it is intended to include these within the scope of the invention, the foregoing classification serving to indicate those types of compounds which seem to be the most important at the present time.

The new compositions of the invention may be water-soluble, water-insoluble, or water-dispersible. In this respect their characteristics may vary widely depending largely upon the selection of the radical of which they are composed. The polyoxyalkylene radical will ordinarily be a solubilizing radical, that is, a simple oxyalkylene chain, although as has been pointed out, it may contain a hydrophobe group, such as a long hydrocarbon chain. Similarly, the solubility characteristics of the polybasic acids used may vary, while with the hydroxylated bodies, the entire range from complete water-solubility to substantially complete water-insolubility in included.

In all of the foregoing, the description has been of the monomeric compositions. Compositions of this nature may tend to form polymeric compositions, particularly where the hydroxylated bodies contain more than one hydroxyl group, and this formation of polymeric bodies may be due to continuous esterification or may be due to etherification, in both instances elimination of water being involved. It is to be understood that the polymeric forms are included within the scope of the invention, although, for convenience and simplicity, the monomeric form is referred to in the specification and claims.

The invention will be illustrated by the following specific examples, but it is not limited thereto. The examples illustrate three different procedures by which the compositions of the invention may be prepared; and it is to be understood that instead of the specific compounds used in carrying out the procedures of the examples, other hydroxylated bodies, polybasic acids, polyalkylene oxides or polyoxyalkylene glycols may be used.

*Example 1.*—Maleic anhydride is reacted with cetyl alcohol in equimolar proportions, forming the monoester of cetyl alcohol with maleic acid. The resulting acid ester is treated with ethylene oxide in an autoclave at a temperature of around 100–150° C., the ethylene oxide being added in relatively small increments as consumed until a total of about 10 molar proportions of ethylene oxide have been reacted with the acid ester.

Instead of cetyl alcohol, any of the various hydroxylated bodies referred to above may be used. Instead of maleic anhydride, other polybasic acids or anhydrides, etc., including those referred to above may be used, and instead of ethylene oxide, other alkylene oxides, such as propylene oxide, may be used.

The compounds derived from maleic anhydride or acid, or other unsaturated polybasic acids, may be converted to the corresponding sulfo acids by appropriate treatment. For example, the maleic acid compounds may be treated with sodium bisulfite in the known way and converted into the corresponding derivatives of sulfo-succinic acid. In forming the new compounds, instead of using an unsubstituted polybasic carboxy acid, substituted acids, such as sulfo-succinic acid may be used; but if they contain reactive groups other than the carboxy group, it is usually necessary to block these groups, as by neutralizing them with a metal, such as an alkali metal, or in other ways.

*Example 2.*—Diethanolcetyl amine, formed by treating cetyl amine with 2 moles of ethylene oxide, is esterified with maleic anhydride in equimolar proportions, with production of the mono ester of diethanolcetyl amine with maleic acid, the esterification being accomplished in the known way by heating, usually in the presence of a small amount of a catalyst, such as toluene sulfonic acid. The resulting acid ester is then esterified with nonaethylene glycol, again using equimolar proportions, with heating at around 120–150° while passing through the mixture a current of an inert gas such as nitrogen and carrying the reaction forward until it is substantially complete.

*Example 3.*—Maleic anhydride and nonaethylene glycol, in equimolar proportions, are reacted by heating to around 120 to 150° C. for a period of time sufficient to bring about substantial esterification, with the production of the acid ester of maleic acid with nonaethylene glycol. The remaining carboxyl group is then esterified with the ethyl ester of ricinoleic acid.

We claim:

1. Compositions of matter containing a substantial proportion of an esterified aliphatic polycarboxy acid fractional monoester of a polyoxyalkylene glycol, said esterification involving a hydroxyl group of a hydroxylated body, said polycarboxy acid having not more than 6 carbon atoms, said polyoxyalkylene glycol radical having from 7 to 17 alkylene groups.

2. Compositions of matter containing a substantial proportion of an esterified aliphatic polycarboxy acid fraction monoester of a polyoxyethylene glycol, said esterification involving a hydroxyl group of a hydroxylated body, said polycarboxy acid having not more than 6 carbon atoms, said polyoxyethylene glycol radical having from 7 to 17 ethylene groups.

3. Compositions of matter containing a substantial proportion of an esterified aliphatic dicarboxy acid fractional monoester of a polyoxyalkylene glycol, said esterification involving a hydroxyl group of a hydroxylated body, said dicarboxy acid having not more than 6 carbon atoms, said polyoxyalkylene glycol radical having from 7 to 17 alkylene groups.

MELVIN DE GROOTE.
BERNHARD KEISER.